United States Patent
Gruenhagen et al.

(10) Patent No.: US 9,098,546 B2
(45) Date of Patent: Aug. 4, 2015

(54) ADVANCED BUSINESS QUERY LANGUAGE

(71) Applicants: Andreas Gruenhagen, Muehlhausen (DE); Christian Stork, Boenen (DE); Kerstin Hoeft, Wieslock (DE); Reiner Singer, Schriesheim (DE); Michael Brombach, Leimen (DE); Marcel Hermanns, Heidelberg (DE)

(72) Inventors: Andreas Gruenhagen, Muehlhausen (DE); Christian Stork, Boenen (DE); Kerstin Hoeft, Wieslock (DE); Reiner Singer, Schriesheim (DE); Michael Brombach, Leimen (DE); Marcel Hermanns, Heidelberg (DE)

(73) Assignee: SAP SE, Walldorf (DE)

( * ) Notice: Subject to any disclaimer, the term of this patent is extended or adjusted under 35 U.S.C. 154(b) by 281 days.

(21) Appl. No.: 13/712,898

(22) Filed: Dec. 12, 2012

(65) Prior Publication Data

US 2014/0164425 A1    Jun. 12, 2014

(51) Int. Cl.
*G06F 17/30* (2006.01)

(52) U.S. Cl.
CPC .... *G06F 17/30424* (2013.01); *G06F 17/30604* (2013.01); *G06F 17/30569* (2013.01); *G06F 17/30595* (2013.01)

(58) Field of Classification Search
CPC .............. G06F 17/30424; G06F 17/30604; G06F 17/3056; G06F 17/30569; G06F 17/30595; G06F 17/30551; G06F 17/3089

USPC .......................................... 707/769
See application file for complete search history.

(56) References Cited

U.S. PATENT DOCUMENTS

| | | | |
|---|---|---|---|
| 6,678,674 B1 | 1/2004 | Saeki | |
| 7,647,298 B2* | 1/2010 | Adya et al. | 707/999.002 |
| 7,680,767 B2* | 3/2010 | Adya et al. | 707/999.002 |
| 7,861,253 B1* | 12/2010 | Lettington et al. | 719/328 |
| 8,285,728 B1 | 10/2012 | Rubin | |
| 2006/0235839 A1* | 10/2006 | Krishnaprasad et al. | 707/4 |
| 2010/0153431 A1 | 6/2010 | Burger | |
| 2010/0281458 A1* | 11/2010 | Paladino et al. | 717/106 |
| 2012/0143896 A1* | 6/2012 | Gatter | 707/769 |
| 2014/0019429 A1* | 1/2014 | Driesen et al. | 707/703 |

OTHER PUBLICATIONS

European Search Report dated Jan. 2, 2014 for corresponding European patent application No. 13003831.8.

* cited by examiner

*Primary Examiner* — Jean M Corrielus
(74) *Attorney, Agent, or Firm* — Mintz Levin Cohn Ferris Glovsky and Popeo, P.C.

(57) ABSTRACT

A new query language can be embedded in a business application programming language (e.g., the ABAP language). A query language consistent with implementations of the current subject matter can be based on a graph data-model of connected business objects (BO) or other data objects and can be designed as an efficient query language embedded into the business application programming language runtime, thereby allowing expression of business logic in a declarative manner.

18 Claims, 22 Drawing Sheets

```
SELECT INTO TABLE :result
FROM SALES_ORDER~>ROOT (
    TOTAL_NET_AMOUNT,
    TOTAL_TAX_AMOUNT,
    \BUYERY_PARTY-ORGANIZATION-COMPANY_NAME,
    \BUYERY_PARTY\MAIL[
        VALIDITY_START_DATE <= :sy-datum AND
        VALIDITY_END_DATE > :sy-datum
    ]-ADDRESS-CONTENT
)
```

```
SELECT INTO TABLE :result
FROM SALES_ORDER~>ROOT (
    TOTAL_NET_AMOUNT,
    TOTAL_TAX_AMOUNT,
    ELEMENTS \BUYERY_PARTY (
        ORGANIZATION-COMPANY_NAME,
        \MAIL[  VALIDITY_START_DATE <= ':sy-datum'
           AND VALIDITY_END_DATE  >  ':sy-datum' ]-
        ADDRESS-CONTENT
    )
```

*FIG. 3*

```
SELECT so.TOTAL_NET_AMOUNT,
       so.TOTAL_TAX_AMOUNT,
       bupa.ORG_COMPANY_NAME, mail.address_content
FROM SALES_ORDER AS so
INNER JOIN <rbam_node_table>
ON <rbam_join_condition>
...
LEFT OUTER JOIN BUPA_ROOT AS bupa
ON so.BUYER_ID = bupa.NODE_ID
LEFT OUTER JOIN BUPA_MAIL mail
ON   bupa.NODE_ID = mail.PARENT_NODE_ID
   AND mail.VALIDITY_START_DATE <= :sy-datum
   AND mail.VALIDITY_END_DATE > :sy-datum
WHERE <rbam_condition>
```

```
REPORT z_abql_demo.
START OF SELECTION.
...
DATA: l_itab TYPE TABLE OF ... .

SELECT INTO TABLE :l_itab
FROM zabql_sales_order~>root
(
  node_id,
  cash_discount_percent
).
```

```
REPORT z_abql_demo.
START OF SELECTION.
...
DATA: l_itab TYPE TABLE OF ... .

SELECT INTO TABLE :l_itab
FROM zabql_sales_order~>root
(
  node_id,
  cash_discount_percent,
  total_net_amount-content
).
```

```
REPORT z_abql_demo.
START OF SELECTION.
...
DATA: l_itab TYPE TABLE OF ... .

SELECT INTO TABLE :l_itab
  FROM zabql_sales_order~>root
  (
    node_id,
    cash_discount_percent,
    total_net_amount-content,
    total_gross_amount
  ).
```

```
REPORT z_abql_demo.
DATA: l_wa1 TYPE ... .
...

SELECT INTO :l_wa1
  FROM zabql_sales_order~>root
  (
    node_id,
    total_net_amount-content ).
ENDSELECT.

SELECT INTO :data(l_wa2)
  FROM zabql_sales_order~>root
  (
    node_id,
    total_net_amount-content
  ).
ENDSELECT
```

```
REPORT z_abql_demo.
START OF SELECTION.
...
SELECT INTO TABLE :data(l_itab)
FROM zabql_sales_order~>root
(
  node_id,
  cash_discount_percent AS dis,
  total_net_amount-content,
  total_gross_amount AS ![group]
).
```

```
DATA: l_itab TYPE TABLE OF ... .

SELECT INTO TABLE :l_itab
FROM zabql_sales_order~>root
( node_id,
  cash_discount_percent
)
WHERE total_net_amount-content > p'5' .

DATA: l_itab TYPE TABLE OF ... .

SELECT INTO TABLE :l_itab
FROM zabql_sales_order~>root[
       total_net_amount-content > p'5' ]
( node_id,
  cash_discount_percent
).
```

DATA: l_itab TYPE TABLE OF ... .

SELECT INTO TABLE : l_itab
FROM zabql_sales_order~>root
( node_id,
cash_discount_percent
)
WHERE total_net_amount-content > p'500'
AND ( total_net_amount-curr_code = 'DE'
OR total_net_amount-curr_code = 'EN' ).

DATA: l_itab TYPE TABLE OF ... .

SELECT INTO TABLE : l_itab
FROM zabql_sales_order~>root
( node_id,
cash_discount_percent
)
WHERE total_net_amount-content
BETWEEN p'500' and p'1000'
AND total_gross_amount-currency_code
LIKE 'D%'.

```
DATA: l_itab TYPE TABLE OF ... .

APPEND VALUE #( sign = 'I' option = 'CP' low =
'EU*' ) TO range_itab.

SELECT INTO TABLE :l_itab
FROM zabql_sales_order~>root
( node_id,
  cash_discount_percent
)
WHERE total_net_amount-curr_code
  IN :range_itab
```

```
DATA: l_itab TYPE TABLE OF ... .

SELECT INTO TABLE :l_itab
FROM zabql_sales_order~>root
( node_id,
  cash_discount_percent
)
WHERE total_net_amount-curr_code
  IN ( 'EUR' , 'DOL' ).
```

FIG. 10A

```
DATA: l_itab TYPE TABLE OF ... .

SELECT INTO TABLE :l_itab
FROM zabql_sales_order~>root
( node_id,
  cash_discount_percent
)
WHERE NOT total_net_amount-curr_code
IN ( 'EUR', 'DOL' )
AND NOT total_net_amount-content
BETWEEN p`500` and p`1000`.
```

```
DATA: l_itab TYPE TABLE OF ...,
      lower TYPE p length ...,
      upper TYPE p length ... .

SELECT INTO TABLE :l_itab
FROM zabql_sales_order~>root
( node_id,
  cash_discount_percent
)
WHERE total_net_amount-content
BETWEEN :lower AND :upper.
```

```
DATA: l_itab TYPE TABLE OF ....,
      l_id_tab TYPE TABLE OF ....,

SELECT INTO TABLE :l_itab
FROM zabql_sales_order->root
( node_id, total_net_amount-content,
  cash_discount_percent
)
WHERE node_id IN TABLE :l_id_tab.

SELECT INTO TABLE :l_itab
FROM zabql_sales_order->root
( node_id, cash_discount_percent )
WHERE ( total_net_amount-curr_code,
        total_tax_amount-curr_code )
IN TABLE :l_curr_tab ( :curr1, :curr2 ).
```

REPORT z_abql_demo.
...
SELECT INTO TABLE :data(l_itab)
FROM zabql_sales_order~>root
(
  node_id,
  \buyer-company_name
).

REPORT z_abql_demo.
...
SELECT INTO TABLE :data(l_itab)
FROM zabql_sales_order~>root
( node_id )
WHERE \buyer-company_name
         LIKE 'SAP%'.

REPORT z_abql_demo.
...
SELECT INTO TABLE :tab_1 FROM
zabql_sales_order~>item (
  \to_root\seller-company_name,
  \product\description[language_code = 'D']-
  content,
  \product\description[language_code = 'E']-
  content
).

FIG. 14B

```
REPORT z_abql_demo.
...
SELECT INTO TABLE :data(tab_1) FROM
zabql_sales_order~>item (
    \to_rootbuyer-company_name AS buyer,
    \to_rootseller-company_name AS seller,
    gross_amount-content,
    cash_discount_percent ) .
```

```
REPORT z_abql_demo.
...
SELECT INTO TABLE :data(tab_1) FROM
zabql_sales_order~>root[ node_id = :so_id ]\item
(
    gross_amount-content,
    cash_discount_percent )
    WHERE node_id = :item_id.
```

```
SELECT INTO TABLE :data(tab_1) FROM
zabql_sales_order~item (
    ELEMENTS \to_root ( \buyer-company_name
AS buyer,
            \seller-company_name AS seller
    ),
    gross_amount-content ) .

SELECT INTO TABLE :data(tab_1) FROM
zabql_sales_order~item (
    STRUCTURE \to_root ( \buyer-
company_name AS buyer,
            \seller-company_name AS seller
    ) AS partner,
    gross_amount-content ) .
```

```
REPORT z_abql_demo.
...
SELECT INTO :data(tab_1) FROM
zabql_sales_order~root
    ( node_id )
WHERE \buyer-company_name LIKE 'SAP%'
AND   \seller-company_name LIKE 'PAS%'
.

SELECT INTO :data(tab_1) FROM
zabql_sales_order~item
    ( node_id )
WHERE \to_rootbuyer-company_name
            LIKE 'SAP%'
AND   net_amount-content < p'500 .
```

REPORT z_abql_demo.

... (1)

SELECT INTO :l_wa
FROM zabql_sales_order~>root
( node_id )
WHERE ALL
\item[ delivery_periode > p'5' ].

... (2)

SELECT INTO :l_wa
FROM zabql_sales_order~>root
( node_id )
WHERE EXISTS
\item[ delivery_periode > p'5' ].

<CONDITION>:=
.....
| (EXISTS | ALL) (\<ASSOC>)*[ <CONDITION> ]
.....

REPORT z_abql_demo.
...
SELECT INTO :l_wa
FROM zabql_sales_order~>root (
    ( node_id )
WHERE ALL \item\product[
    EXISTS \description[language_code = 'D' ]
    AND EXISTS \description[language_code = 'E' ]
].

REPORT z_abql_demo.
...
SELECT INTO :l_wa
FROM zabql_sales_order~>root (
    ( node_id )
WHERE EXISTS \item\product[
    ALL \description[ language_code <> 'D'
        AND language_code <> 'E' ]
].

FIG. 18A

```
REPORT z_abql_demo.
...
SELECT INTO :l_wa
FROM zabql_sales_order->root (
  ( node_id )
WHERE ALL \item\product[
    EXISTS \description[ language_code = 'D' ]
    AND EXISTS \description[ language_code = 'E' ]
  ]
  AND EXISTS \item [ node_id > x'00' ].
```

```
REPORT z_abql_demo.
...
SELECT INTO TABLE :data(l_itab1)
FROM zabql_sales_order~root
(
  \buyer-company_name,
  SUM( \item-net_amount-content )
).
SELECT INTO TABLE :data(l_itab2)
FROM zabql_sales_order~root
(
  \buyer-company_name,
  SUM( \item-net_amount-content ),
  COUNT( DISTINCT \item-node_id )
).
```

```
REPORT z_abql_demo.
...
"(1)
SELECT INTO TABLE :data(l_itab1)
FROM zabql_sales_order~root
(
  \buyer-company_name,
  SUM( \item-net_amount-content )
) GROUP BY \buyer-company_name.
"(2)
SELECT INTO TABLE :data(l_itab2)
FROM zabql_sales_order~root
(
  \buyer-company_name AS buyer,
  \seller-company_name AS seller,
  COUNT( DISTINCT \item-node_id ),
) GROUP BY ( buyer, seller).
```

SELECT INTO TABLE :l_itab
FROM zabql_sales_order~>root
( node_id,
cash_discount_percent
) ORDER BY total_net_amount-content.

SELECT INTO TABLE :l_itab
FROM zabql_sales_order~>root
( node_id,
cash_discount_percent AS dis
) ORDER BY (
dis DESCENDING,
total_tax_amount-content,
\buyer-company_name   ).

SELECT INTO TABLE :data(l_itab2)
FROM zabql_sales_order~>root
(
\buyer-company_name   AS buyer,
\seller-company_name  AS seller,
COUNT( \item-node_id ) AS itemCount
) GROUP BY ( buyer, seller)
ORDER BY ( buyer, seller, itemCount).

*FIG. 21B*

```
SELECT INTO TABLE :l_itab
FROM zabql_sales_order~>root
( node_id,
  cash_discount_percent
) ORDER BY total_net_amount-content
UP TO 10 ROWS.

DATA: n TYPE i.
...
SELECT INTO TABLE :l_itab
FROM zabql_sales_order~>root
( node_id,
  cash_discount_percent
) ORDER BY total_net_amount-content
STARTING AT ROW :n UP TO 10 ROWS.
```

ADVANCED BUSINESS QUERY LANGUAGE

TECHNICAL FIELD

The subject matter described herein relates to approaches for performing queries on a database.

BACKGROUND

Ease of consumption and efficient execution of business logic implemented in business software programming languages and based on data retained in complex structured data models (e.g. business object models) can be key for the optimal performance, maintainability, and usability in a business software architecture, such as for example an enterprise resource planning (ERP) system.

Business logic in applications supported by business software architectures can in many examples be implemented within a data structure service provider, such as for example a business object service provider. A central framework, which can be based on a business software programming language (such as for example the advanced business application programming or ABAP language) can access business objects or other data structures having one or more similar features by calling a generic data structure application programming interface (API), such as for example a business object API. Reading data can also be an important part of the implementation of any business object or comparable data structure.

SUMMARY

Implementations of the current subject matter provide an improved query language that can be used in association with business software architectures. In one aspect, a method includes determining, at a language layer of a query language architecture, a query syntax of a received query and a definition of a result set for the query. Semantics of the received query are checked at a compiler layer of the query language architecture, and a field expression corresponding to the result set is read from a data dictionary in a persistent layer of a database from which query results are to be returned. The field expression is built by the compiler level into a query statement. The query, including the query statement, is executed at a runtime layer of the query language architecture, and results to the query are returned per the result set based on execution of the query on the database.

In optional variations, one or more additional features can be included in any feasible combination within the scope of the current subject matter. For example, the query language architecture can optionally be implemented in a business software programming language as part of a business software architecture. The business software programming language can optionally include an advanced business application programming (ABAP) language. The query syntax can optionally include use of logical associations to represent connections between entities. The compiler layer of the query language architecture can optionally support a single data model usable on multiple application layers of a multi-layer business software architecture. The method can optionally further include pushing logic used in data retrieval for response to the query to a database level from which the query results are returned.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3 shows another example code segment consistent with implementations of the current subject matter;

FIG. 4 shows another example code segment consistent with implementations of the current subject matter;

FIG. 6A through FIG. 12 show example code segments illustrating a basic query structure consistent with implementations of the current subject matter;

FIG. 14A through FIG. 19 show example code segments illustrating accessing of associated business objects consistent with implementations of the current subject matter;

FIG. 20A and FIG. 20B show example code segments illustrating aggregation consistent with implementations of the current subject matter; and FIG. 21A through FIG. 22 show example code segments illustrating sorting and paging consistent with implementations of the current subject matter.

DETAILED DESCRIPTION

Figure 1:
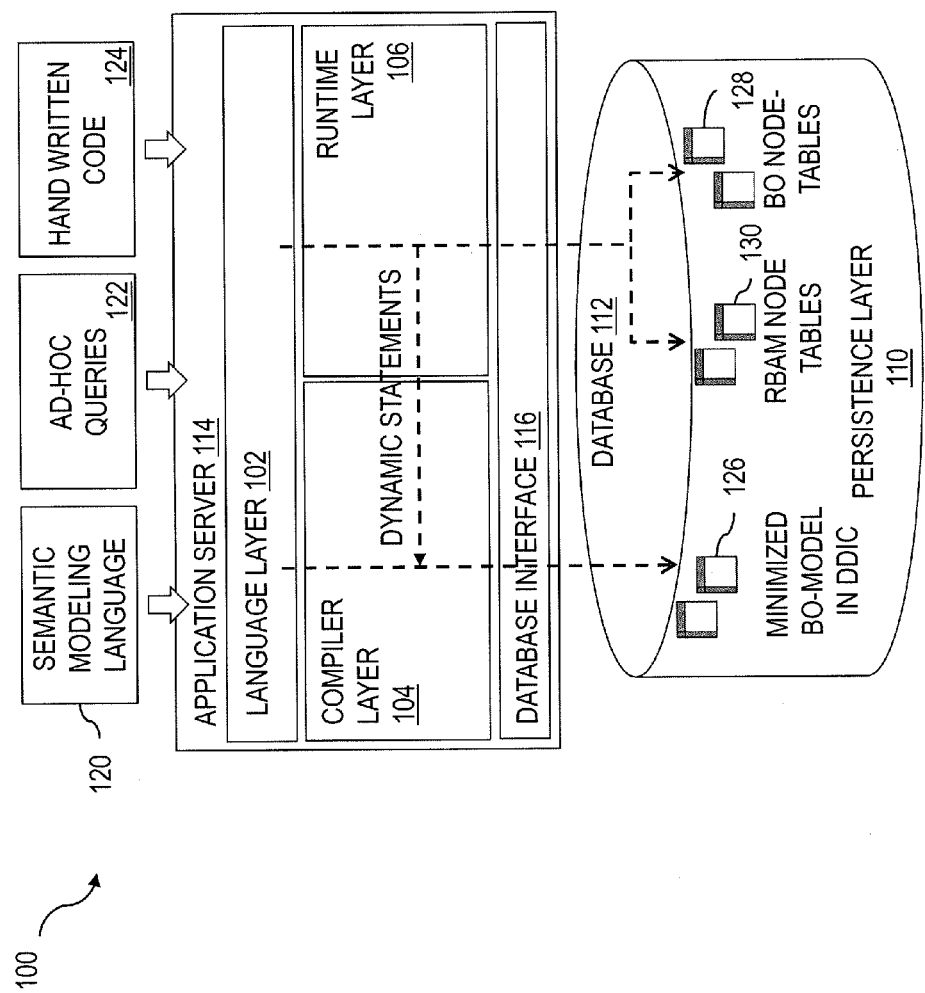
FIG. 1 is a diagram illustrating aspects of a software architecture showing features consistent with implementations of the current subject matter.

Implementations of the current subject matter can provide an easy to use, powerful query interface that can be used for database-related data retrieval tasks performed in a relational database system based on a business software programming language, such as for example the advanced business application programming language (ABAP) implementations of the current subject matter can also be used with any database that can be queried by SQL as the query interface is independent of the underlying storage model. Consistent with implementations of the current subject matter, performance can be improved by minimizing a number of application layers involved in query execution and data retrieval and by pushing down more logic to the relational database. A query interface having one or more of the features discussed below is referred to herein as an advanced business query language (ABQL).

An ABQL consistent with implementations of the current subject matter can be embedded in a business software programming language, such as for example the ABAP language. Syntax of queries performed in such an ABQL can therefore be checked by the business software programming language compiler, which can support a "one data model" approach usable on all or at least on multiple application layers, for example in a multi-layer business software architecture or other complex software architecture. A developer can make use of a language-integrated query interface similar to that provided by currently available approaches, for example those based on Open SQL or the like. In some examples, an ABQL can be used instead of Open SQL. If necessary or desired, both query languages could be used side by side as well.

An ABQL can be declarative, and "SQL-like," and can allow the use of path expressions to address inter-data element associations. Additionally, queries can be executed directly on a relational database. In association with a high performance, in-memory database, this approach can provide significant performance improvements. Advanced features, such as for example structured query results, aggregation, ordering, and paging, can be supported using an ABQL consistent with implementations of the current subject matter.

Static and dynamic invocation of ABQL code can be supported via one or more respective interfaces in an ABQL consistent with implementations of the current subject matter. Static invocation of ABQL code can be important for hand-written business software programming language code. Code resulting from static invocation of ABQL code can be relatively easy to use, and can be readily checked and prepared at compile time. Dynamic invocation of ABQL code can be useful for frameworks that generate queries at runtime.

Many modern business software systems, including but not limited to enterprise resource planning software systems, relational database systems, or the like can be built upon metadata, which is generally defined as data that describes or otherwise provides information about other data. One type of metadata can include information regarding data elements of a data structure upon which a given data element has a dependency. The term data element, as used herein, can refer to any data format, including but not limited to a data object or business object, a node or a root node of a data or business object, and the like. The term dependency, as used herein, can refer to any unidirectional relationship between data elements, in which a dependent data element accesses data, metadata, data formats or structures, or the like from a depended upon data element.

In general, result sets from queries on business objects or other types of data objects or higher level aggregations of data elements can be "deep" in the sense that they are built on the hierarchies, dependencies, or other associations between the aggregated data elements. In order to support the efficient processing of those result sets, a new ABAP entity called "mesh" shall be introduced. A mesh can be created by ABQL statements and can be further processed in a ABAP runtime environment.

Derived fields can optionally enhance business objects and other data structures. In other words, derived fields can be based on other fields by using expressions. The actual value of a field value can be calculated by evaluating the field expression. Calculated fields can be accessed in an ABQL consistent with implementations of the current subject matter in the same manner as conventional persistent fields. The query language runtime environment can handle evaluating the field's expression before returning the result. An example of a calculated field is the computation of a person's age based on a provided the day of birth. Such information is not generally persisted in the database because it depends on the current date. As a further feature, reusable functions can be used within an ABQL and calculated field expressions. Such functions can be defined as their own entities and can be referenced within a calculated fields expression or an ABQL statement.

Query execution in a relational database can also include authority checks. In a conventional approach, permission control can typically be checked in the business software programming language (e.g., the ABAP language), for example after the data has been retrieved from the database. This approach can include a performance penalty, because all of the query results are first fetched from the relational database before the result set provided in response to a query request is reduced in size by applying one or more authority check rule to exclude results for which the query originator lacks the appropriate permissions or authority to access.

An ABQL consistent with implementations of the current subject matter can also take into account transactional data currently maintained in a business programming language (e.g., in the ABAP language). A mechanism can be provided within the ABQL to also include the state of transactional data in a query result. Transactional data can include data pertaining or relating to day-to-day business operations. A programmer can define one or more views with ABQL statements. Such views can be used as a data source in other ABQL statements or for building new views.

An ABQL consistent with implementations of the current subject matter can support advanced features for data retrieval, such as for example basic searches or fuzzy searches such as are currently available in TREX (Tree Regular Expressions for XML), paging, and the like.

An ABQL consistent with implementations of the current subject matter can improve application performance in general by providing one or more features, such as for example pushing down logic (e.g., sorting, expressions, authority checks) used in data retrieval to the database level; bypassing existing frameworks; being efficiently implemented (e.g., natively in the kernel of the business software programming language, which can optionally be the ABAP language); minimizing round trips to the database (e.g., by using multi fetch); making use of efficient data transfer formats (e.g., multiple result sets), and the like.

For improved performance, as shown in FIG. 1, a compiler layer 104 and a runtime layer 106 for an ABQL can be natively implemented in the business software programming language (e.g. the ABAP language) kernel. Different layers can be involved in statement execution in the business software programming language (e.g., ABAP) kernel. For example, as shown in the diagram illustrating an example ABQL architecture 100 of FIG. 1, a language layer 102, a compiler layer 104, a runtime layer 106, and a persistence layer 110 can be included. The persistence layer 110 can advantageously be part of the underlying database 112 (e.g., a relational database) upon which queries are executed. One or more of the language layer 102, the compiler layer 104, and the runtime layer 106 can be implemented on a computing system or systems that can include one or more programmable processors. As shown in FIG. 1, such a system or systems are termed an application server 114. A database interface 116 can provide necessary adaptation or transformation of commands, queries, data reads and writes, data changes and deletions, etc. passed to and from the database 112.

Figure 2:
FIG. 2 shows an example code segment consistent with implementations of the current subject matter.

A language layer 102 can be the user interface for an application programmer and can have, as a main part, syntax of the business software programming language. Queries can be received at the language layer 102 in the form of queries composed in a semantic modeling language 120 (e.g., the semantic application design language or "SADL"), as ad-hoc queries 122, as hand written code 124, or the like. The language layer 102 can set the query syntax itself (e.g., "What is selected?") and also establish a result set definition (e.g. "How is the data transferred into the business software programming language?"). The result set definition can be represented by the INTO-clause of the query statement. The example illustrated in the code segment 200 of FIG. 2 shows an ABQL statement executing a simple select operation using path expressions. This example illustrates some similarities between an ABQL consistent with implementations of the current subject matter and SQL. As in Open SQL, a select in an ABQL can begin with the keyword SELECT.

After the initial keyword, the INTO-clause follows, which specifies the name of the business software programming language variable (e.g., an ABAP variable) holding the result set. For flat result sets, INTO-clauses from Open-SQL, including but not limited to INTO <internal table>, INTO (<field1>, <field2>, ..., <fieldN>), INTO <workarea>, and the like, remain valid. A FROM-clause typically follows an INTO-clause. A business object node (or other data structure element) can be specified as a source in the FROM-clause. As in Open SQL, the INTO-clause and the FROM-clause can be permuted.

A sequence of node-clauses can follow the INTO-clause and FROM-clause. Such node-clauses can replace Open SQL SELECT-clauses. Like such a SELECT-clause, the node-clauses describe the structure of the result. In the example of FIG. 2, only one node-clause is shown. For each node in the result, set one business object node (or other similar data element of a data structure such as a data object or the like) as the data source is specified. In the example of FIG. 2, the node ROOT in the business object SALES_ORDER serves as the data source. The content of each node can be specified by a comma-separated list of scalar values.

In the business object that is queried using the example of FIG. 2, the root node ROOT is connected by the association of BUYER_PARTY to the root node of the business object BUSINESS_PARTNER, which again is connected to the business object node MAIL. Connections between entities are not represented by SQL-style joins, but rather by a simplified syntax using logical associations. Generally, this coding style can be advantageous for business objects and other rich data structures, for example because associations represent the logical relationship between entities and simplify the query language statement (an SQL JOIN may be used as in some implementations of the current subject matter as a representation of an association).

The example code segment 200 shown in FIG. 2 can select for each sales-order the total net- and tax-amount, plus the name of buyer organization and the currently valid mail-address. As illustrated in this example above, an ABQL consistent with implementations of the current subject matter can provide a path expression syntax to follow the associations between different data elements in data structures, such as for example data objects or business objects (e.g., between business object nodes). In order to provide an abbreviated syntax, an ABQL can include a prefix notation for repeated path-expressions with a common prefix. The query in the example code segment 200 of FIG. 2 can thus be rewritten as shown in the code segment 300 of FIG. 3.

In a compiler layer 104 consistent with implementations of the current subject matter, the query statement can be parsed, and semantic checks can be performed. The query statement can be parsed at the compiler layer 104. As an example, the text representation of the query statement can be transformed into a representation, which can be used by the runtime layer 106 for efficient statement transformation and execution. At this point, the ABQL statement, which can be originally presented in a business software programming language (e.g., the ABAP language) can be rewritten into native SQL statements, which can be executed in the database 112. Associations, which are used in ABQL, can be transformed into an adequate runtime representation (e.g., SQL joins). Authority checks and expressions for calculated fields can also be executed. FIG. 4 shows an example code segment 400 of native SQL that can be created by the compiler layer 104 by transforming the ABQL statement shown in the example code segment 200 of FIG. 2 to native SQL. The associations in the ABQL query can be replaced as shown in FIG. 4 by SQL LEFT OUTER JOINS in the example code segment 400. The filter condition can be represented in the join condition (the ON-clause) of the second left outer join. Parts of the query that can be inserted for executing authority checks are underlined in the example code segment 400.

The runtime layer 106 can be responsible for query execution. If the query is dynamic, it can require compilation prior to execution. If so, the query can be passed to the ABQL compiler layer 104 and some steps that are performed usually at compile time may be executed here (e.g. parsing, semantic checks, etc). If the query is completely dynamic, the full compilation is generally done at runtime. If only parts of the query are dynamic (e.g., node names or where clause), the query could be pre-compiled at compile-time and the compilation can be completed at runtime when all information is available.

After the query has been prepared, it is sent to the database 112. Depending on the nature of the query, native SQL or SQLScript can be used as an implementation language. Native SQL is generally well-understood and familiar to users for executing simple select statements. SQLScript can be used for query execution, when multiple result sets are retrieved from the database. SQLScript can also be advantageous for implementation of reusable functions, such as for example those that are used in ABQL statements directly or within expressions in calculated fields.

The runtime layer 106 can also handle the integration of transactional buffers. In this context, the term "transactional buffer" refers to a memory buffer providing storage for data valid in the current transactional context. In other words, the scope of the buffered data can be bound to the current transaction. It can be advantageous to keep track of a data image from which data are requested such that the query can be executed accordingly. As an illustrative example, when reading from a transactional data image, a transactional buffer can advantageously be taken into account by the runtime layer 106. Database systems typically support the important properties of atomicity, consistency, isolation, and durability (ACID). Transactional buffers can be used to ensure the isolation property.

The persistence layer 110, which can optionally include a data dictionary, can contain data stored in the database 112. For a query language, which is aware of business objects, the data dictionary can be enriched by additional information, such as for example a minimized business object model 126. In an example, a minimized business object model 126 can contain basic definitions of business object nodes, optionally including calculated fields, associations between the nodes (including filter conditions and association valuations), and the like.

This information can optionally be maintained in a metadata repository and replicated to the data dictionary, which can serve as is the source for metadata during the runtime. Calculated fields can be stored in the data dictionary as well. At query compile time, the field expression can be read from the data dictionary and built into the query statement for evaluation at runtime in the database 112. During query execution, the node tables 128 in the database 112 that contain the data for the business object and role-based access manager (RBAM) node tables 130 can be accessed directly.

As described above, an ABQL consistent with implementations of the current subject matter can generate a core data model and an ABQL query framework from a metadata repository business object. The core data model (referred to in FIG. 1 as a minimized business object model 126) can be stored in the data dictionary as a business object structure. Business objects can form a graph of business object nodes connected by directed and attributed edges (associations). Such a graph can reflect the structure of an underlying relational entity relationship model. Each node can represent an entity (e.g., a table, a view, etc.), and each edge in the graph can corresponds to a relationship between two nodes. Edges can carry arbitrarily complex join conditions between the entities. Each business object node can be mapped to an underlying persistent layer (database table or view). Each association can be mapped to a join condition. Data elements in the minimized business object model 126 can be mapped to a target data structure by position.

Figure 5:
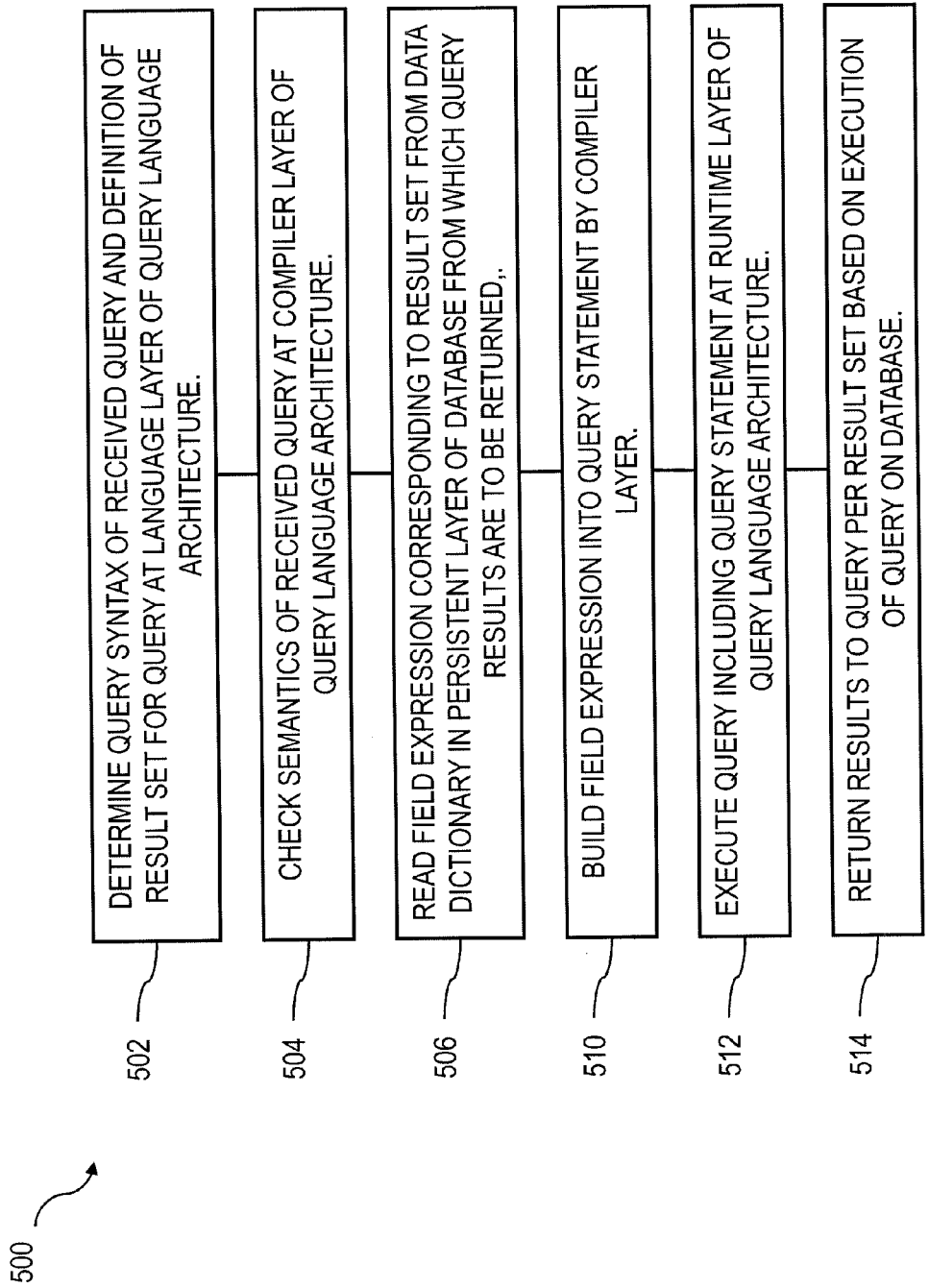
FIG. 5 is a process flow diagram illustrating aspects of a method having one or more features consistent with implementations of the current subject matter.

FIG. 5 shows a process flow chart 500 illustrating an example implementation of the current subject matter in which a method is provided. Such a method can include, at 502, determining a query syntax of a received query and a definition of a result set for the query at a language layer of a query language architecture. At 504, a compiler layer of the query language architecture checks semantics of the received query. A field expression corresponding to the result set can be read at 506 from a data dictionary in a persistent layer of a database from which query results are to be returned. At 510, the compiler layer can build the field expression into a query statement. A runtime layer of the query language architecture can execute the query including the query statement at 512, and at 514 results to the query can be returned per the result set based on execution of the query on the database.

FIG. 6A through FIG. 12 include a series of example code segments showing examples of features that can appear in a basic query structure consistent with one or more implementations of the current subject matter. In the example code segment 600 of FIG. 6A, one or more elements can be selected from a root node of a business object called zabq1_sales_order. In the example code segment 650 of FIG. 6B, sub-elements of nested structures (e.g., total_net_amount-content) can be selected. The selected elements can be mapped into the target variable based on their position in the element list, not their name. In the example code segment 700 of FIG. 7A, whole structures (e.g., total_gross_amount contains currency_code and content) can be selected. In the example code segment 750 of FIG. 7B, a SELECT operation can be made into a workarea and into a table. An inline declaration of ABAP (or another business software programming language) variables can be made (e.g., :data(1_wa2)) as can an inline definition of a new anonymous type for the result.

In the example code segment 800 of FIG. 8A, inline declarations of ABAP tables (e.g., :data(1_itab)) can be made and aliases can be assigned. For example, a default can be the name of the last path step (e.g., total_net_amount-content→content). An escaping mechanism can also be provided (e.g., ![group]). The example code segments 850 and 855 of FIG. 8B show examples of a simple SELECT operation with a WHERE condition. Literals and ABAP (or other business programming language) variables can be required to be typed exactly. A literal is a constant value explicitly given as part of a source code, such as for example a ABQL SELECT statement. A SQL-like WHERE condition can be used and an embedded condition can be supplied in place of the [ . . . ] in FIG. 8B. For a simple SELECT operation with a WHERE condition, the example code segment 900 of FIG. 9A shows an example of complex AND/OR conditions, the example code segment 950 of FIG. 9B shows an example of between and like conditions, the example code segment 1050 of FIG. 10B shows an example of In-Range Table conditions, the example code segment 1100 of FIG. 11A shows an example of negation of conditions, and the example code segment 1150 of FIG. 11B shows an example of flagging of variables with a colon [:].

The example code segment 1200 of FIG. 12 shows an example of an IN TABLE condition. Such a condition, which can be similar to a SQL sub-query, can be used as a filter.

Figure 13:
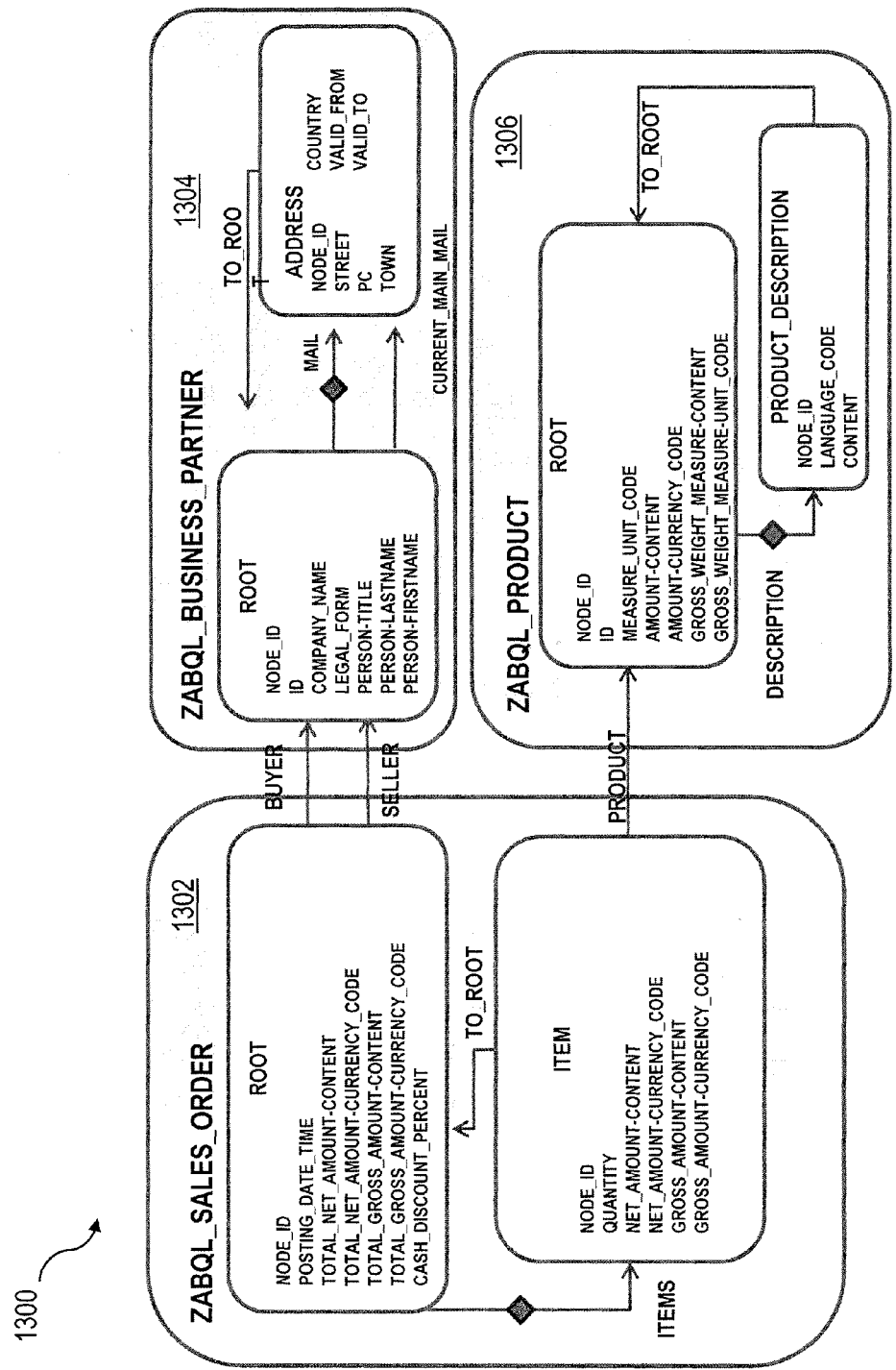
FIG. 13 shows an example of a business object model.

FIG. 13 shows an example of a business object model 1300 including a sales order business object (ZABQL_SALES_ORDER) 1302, a business partner business object (ZABQL_BUSINESS_PARTNER) 1304, and a product business object (ZABQL_PRODUCT) 1306. FIG. 14A through FIG. 19 include a series of example code segments showing examples of features that can appear in queries requiring accessing of associated business objects and filters consistent with one or more implementations of the current subject matter.

In the example code segments 1400 and 1405 of FIG. 14A, the following features are shown: declarative use of associations between business object nodes by path-expressions (\buyer-company_name), prefixing of associations by a backslash [\], use of a dash [-] as a component selector, and use of path expressions at different places (e.g., field list, WHERE condition, or the like). The example code segment 1450 of FIG. 14B and the example code segment 1500 of FIG. 15A illustrate additional features that can appear in element list path expressions of an ABQL consistent with implementations of the current subject matter. A path expression can contain multiple associations and nested conditions (e.g., [language_code='D']). In an element-list, all types of associations can be used. The use of to-N associations can result in redundant data. The term 'To-N associations' refers to set-valued association in contrast to single-valued associations. An ABQL can be capable of handling the same association with different filter conditions (e.g., \description[ . . . ] with different conditions). Associations in the element-list can be translated to left outer joins in SQL. Embedded conditions can be part of the ON-condition of the left outer join. An ABQL consistent with implementations of the current subject matter can distinguish between different associations to the same business object node (e.g., \buyer and \seller).

The example code segment 1550 of FIG. 15B illustrates additional features that can appear in root path expressions of an ABQL consistent with implementations of the current subject matter. Path expressions can also be used to specify the leading business object node (e.g., zabq1_sales_order~>root[node_id=:so_id]\item). The nested condition [i.e., node_id=:so_id] can reference the node_id of the business object node zabq1_sales_order~>root. The WHERE condition can reference the node_id of the BO-node targeted by the association \item.

The example code segment 1600 of FIG. 16A illustrates additional features that can appear in path prefix expressions of an ABQL consistent with implementations of the current subject matter. A plain list of elements can be integrated into the target structure. A new structure type with the corresponding elements can be created and integrated into the target structure. The example code segment 1650 of FIG. 16B illustrates additional features that can appear in path expressions in WHERE conditions of an ABQL consistent with implementations of the current subject matter. Path expressions can be used in the WHERE condition on the left side of all comparison operations. Conditions with different path expressions and attributes can be combined arbitrarily.

The example code segments 1700 and 1750 of FIG. 17A and FIG. 17B illustrate additional features that can appear in to-N associations in WHERE conditions of an ABQL consistent with implementations of the current subject matter. A to-N association in the WHERE condition can be prefixed with a quantor (e.g. ALL or EXISTS). As an example, a SELECT operation can be for all sales orders that contain only items with a delivery period longer than 5. In another example, a SELECT operation can designate all sales orders containing at least one item which has a delivery period longer than 5. Existential predicates can be set using the keywords EXISTS and ALL. EXISTS and ALL conditions can be nested and arbitrarily combined with other conditions. Translation of ABQL quantors to native SQL can, for example, include one or more of the following features: EXISTS can map to a SQL Exists (e.g., dependent on a sub-select <CONDITION>), ALL can map to a SQL Not Exists (e.g. dependent on a subs-elect not (<CONDITION>).

Figure 19:
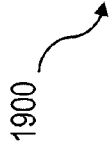

The example code segments 1800, 1850, and 1900 of FIG. 18A, FIG. 18B, and FIG. 19 illustrate additional features that can appear in nested ALL and EXISTS conditions in an ABQL consistent with implementations of the current subject matter. The example 1800 of FIG. 18A shows a SELECT operation of sales orders which contain at least one products which neither has a German nor an English description, while the example 1850 of FIG. 18B shows a select of sales orders which only contain products which have a German and English description. This query would return empty sales orders as well. According to Boolean logic, sales orders containing no items fulfill the ALL-condition. The example 1900 of FIG. 19 shows a SELECT operation of sales orders which only contain products which have a German and English description and which contain at least one item. In this example, the condition [node_id>x'00'] is always true.

As a general note, conditions in path expressions (enclosed in [ ]) cannot contain nested paths expressions with associations. Cardinality of the result set need not be checked at runtime. If several descriptions with [language_code='D'] exist, no error need be raised. In this case, duplicate items can be returned.

FIG. 20A and FIG. 20B include example code segments showing examples of features that can appear in queries requiring aggregation consistent with one or more implementations of the current subject matter. In FIG. 20A, aggregate functions in the element list can include SUM (e.g., \item-net_amount-content), which returns a sum of all items of the individual sales orders, as well as other standard aggregation functions (including but not limited to MAX, MIN, SUM, AVG, COUNT). A path can be required to contain a to-N association. In a SQL translation, a Group By operation can include all entries of the SELECT list and the ORDER BY list, which are not aggregated, as well as the primary key of the root BO-node (e.g., zabq1_sales_order~>root). Grouping can be performed in a manner similar to that of SQL. For example, the GROUP BY clause can be required to contain all not aggregated elements. A GROUP BY list can reference alias names (e.g., buyer, seller, etc.). Paths in the group by list can be required to not contain to-N associations or conditions.

FIG. 21A through FIG. 22 include example code segments showing examples of sorting and paging features that can appear in queries consistent with one or more implementations of the current subject matter. In the code segment 2100 of FIG. 21A, a result can be ordered lexicographically according to an ORDER BY list. The ORDER BY list can contain any path including alias names, but no to-N associations or conditions. An ORDER BY direction can be completed in either of a DESCENDING or ASCENDING manner (in an example, a default order direction can be ASCENDING). In the code segment 2150 of FIG. 21B, a GROUP BY and an ORDER BY can be combined. If an explicit grouping exists, the order by list can contain entries of the GROUP BY list or aggregated elements (e.g., as referenced by alias). In the code segment 2200 of FIG. 22, the number of retrieved rows can be restricted, for example, by UP TO <n> ROWS.

Optionally, the starting row can be specified, for example by STARTING AT ROW <n>. Both elements can be used in combination with an ORDER BY clause.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed:

1. A computer program product comprising a non-transitory machine-readable medium storing instructions that, when executed by at least one programmable processor, cause the at least one programmable processor to perform operations comprising:

determining, at a language layer of a query language architecture, a query syntax of a received query and a definition of a result set for the query;

checking, at a compiler layer of the query language architecture, semantics of the received query, the compiler layer supporting a single data model usable on multiple application layers of a multi-layer business software architecture;

reading, from a data dictionary in a persistent layer of a database from which query results are to be returned, a field expression corresponding to the result set;

building, by the compiler layer, the field expression into a query statement;

executing, at a runtime layer of the query language architecture, the query including the query statement; and returning results to the query per the result set based on execution of the query on the database.

2. A computer program product as in claim 1, wherein the query language architecture is implemented in a business software programming language as part of a business software architecture.

3. A computer program product as in claim 2, wherein the business software programming language comprises an advanced business application programming (ABAP) language.

4. A computer program product as in claim 1, wherein the query syntax comprises use of logical associations to represent connections between entities.

5. A computer program product as in claim 1, wherein the operations further comprise pushing logic used in data retrieval for response to the query to a database level of the database.

6. A computer program product as in claim 1, wherein the compiler layer and the runtime layer are natively implemented in a business software programming language kernel.

7. A computer program product as in claim 1, wherein the reading of the field expression from the data dictionary in the persistent layer of the database comprises accessing a minimized business object model comprising one or more of definitions of business object nodes, calculated fields, and associations between business object nodes.

8. A system comprising:
at least one programmable processor; and
a machine-readable medium storing instructions that, when executed by the at least one programmable processor, cause the at least one programmable processor to perform operations comprising:

determining, at a language layer of a query language architecture, a query syntax of a received query and a definition of a result set for the query;

checking, at a compiler layer of the query language architecture, semantics of the received query, the compiler layer supporting a single data model usable on multiple application layers of a multi-layer business software architecture;

reading, from a data dictionary in a persistent layer of a database from which query results are to be returned, a field expression corresponding to the result set;

building, by the compiler layer, the field expression into a query statement;

executing, at a runtime layer of the query language architecture, the query including the query statement; and returning results to the query per the result set based on execution of the query on the database.

9. A system as in claim 8, wherein the query language architecture is implemented in a business software programming language as part of a business software architecture.

10. A system as in claim 9, wherein the business software programming language comprises an advanced business application programming (ABAP) language.

11. A system as in claim 8, wherein the query syntax comprises use of logical associations to represent connections between entities.

12. A system as in claim 8, wherein the operations further comprise pushing logic used in data retrieval for response to the query to a database level of the database.

13. A computer-implemented method comprising:
- determining, at a language layer of a query language architecture, a query syntax of a received query and a definition of a result set for the query;
- checking, at a compiler layer of the query language architecture, semantics of the received query, the compiler layer supporting a single data model usable on multiple application layers of a multi-layer business software architecture;
- reading, from a data dictionary in a persistent layer of a database from which query results are to be returned, a field expression corresponding to the result set;
- building, by the compiler layer, the field expression into a query statement;
- executing, at a runtime layer of the query language architecture, the query including the query statement; and
- returning results to the query per the result set based on execution of the query on the database.

14. A computer-implemented method as in claim 13, wherein the query language architecture is implemented in a business software programming language as part of a business software architecture.

15. A computer-implemented method as in claim 14, wherein the business software programming language comprises an advanced business application programming (ABAP) language.

16. A computer-implemented method as in claim 13, wherein the query syntax comprises use of logical associations to represent connections between entities.

17. A computer-implemented method as in claim 13, wherein the operations further comprise pushing logic used in data retrieval for response to the query to a database level of the database.

18. A computer-implemented method as in claim 13, wherein at least one of the determining, the checking, the reading, the building, the executing, and the returning is performed by a system comprising at least one programmable processor.

* * * * *